United States Patent [19]
Dalton et al.

[11] Patent Number: 6,003,505
[45] Date of Patent: Dec. 21, 1999

[54] DEVICE FOR REMOVING STAINS

[75] Inventors: Ralph Dalton, 3340 Del Sol Blvd. #156, San Diego, Calif. 92154; Roy J. Walters, Vista, Calif.

[73] Assignee: Ralph Dalton, San Diego, Calif.

[21] Appl. No.: 08/967,143

[22] Filed: Nov. 10, 1997

Related U.S. Application Data

[63] Continuation-in-part of application No. 08/861,403, May 21, 1997, Pat. No. 5,908,350
[60] Provisional application No. 60/018,980, Jun. 4, 1996.
[51] Int. Cl.$^6$ .............. B28D 5/04; B24D 15/02
[52] U.S. Cl. .............. 125/36; 51/298; 51/308; 451/524; 451/557
[58] Field of Search .............. 51/295, 298, 299, 51/300, 308; 451/523, 524, 525, 527, 534, 538, 540, 544, 557; 125/36

[56] References Cited

U.S. PATENT DOCUMENTS

| | | | |
|---|---|---|---|
| 2,006,308 | 6/1935 | Bush et al. .............. | 451/544 |
| 3,982,358 | 9/1976 | Fukuda .............. | 451/544 |
| 4,945,687 | 8/1990 | Scheider et al. .............. | 451/534 X |
| 5,214,820 | 6/1993 | Shumway et al. .............. | 451/524 X |
| 5,454,844 | 10/1995 | Hibbard et al. .............. | 451/534 X |
| 5,733,178 | 3/1998 | Ohishi .............. | 451/527 X |

OTHER PUBLICATIONS

PMC–121 Flexible Mold Compound—Technical Bulletin, Smooth On, revised 1/92.

PMC–121/30 Flexible Rubber Mold Compound—Technical Bulletin.

*Primary Examiner*—Timothy V. Eley
*Attorney, Agent, or Firm*—Lyon & Lyon LLP

[57] ABSTRACT

A cleaning tool for cleaning vinyl or acrylic type items, such as swimming pools or hot tubs. An aggregate and a binder are mixed together to provide an improved cleaning device. The binder and the aggregates are matched so as to wear at substantially identical rates.

12 Claims, 2 Drawing Sheets

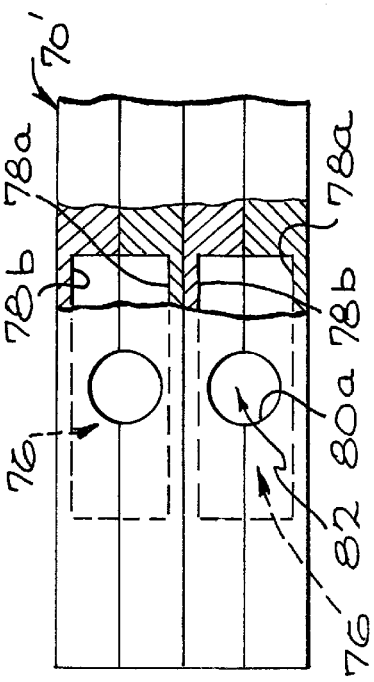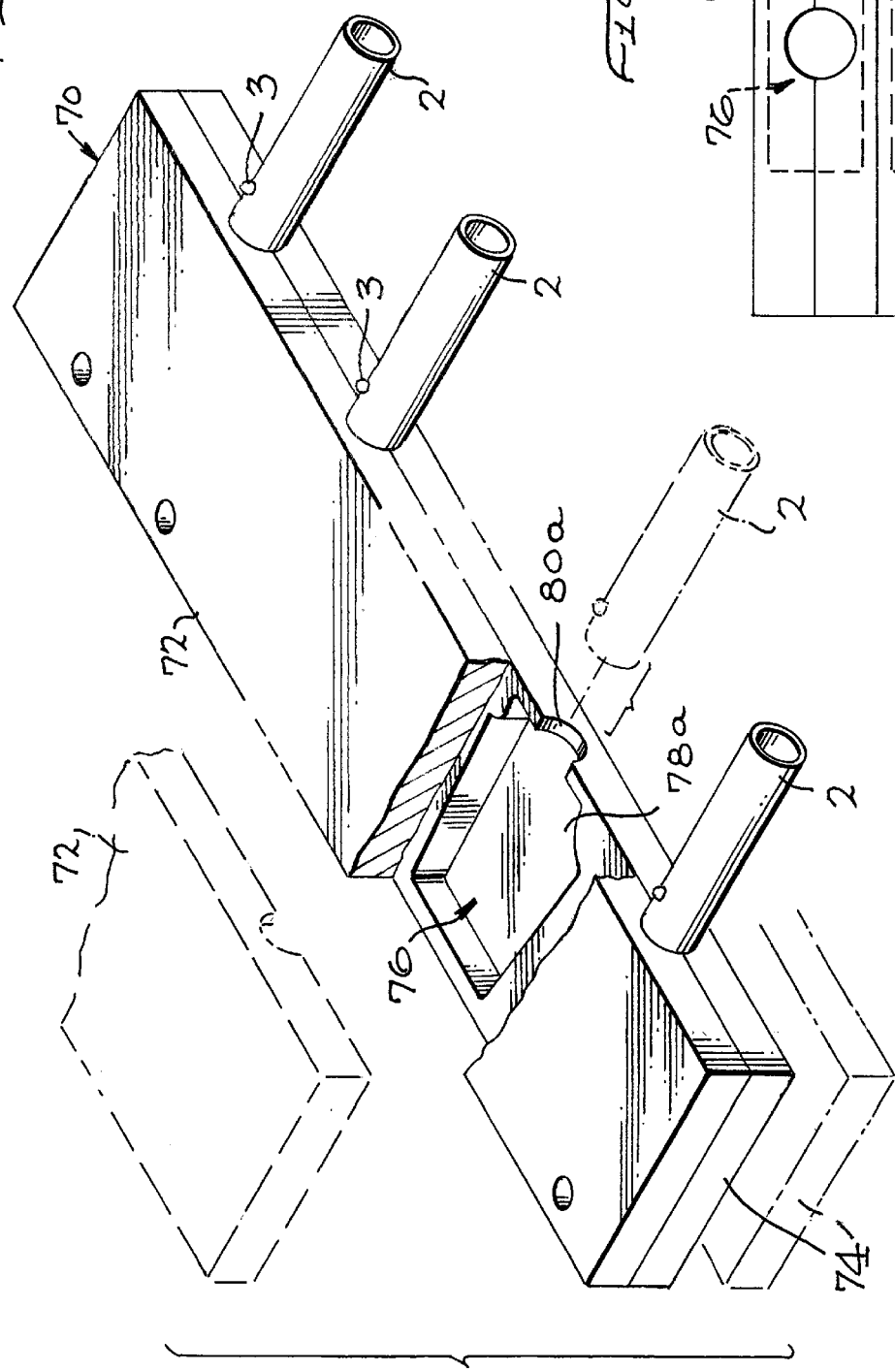

DEVICE FOR REMOVING STAINS

This is a continuation-in-part of U.S. application Ser. No. 08/861,403 filed May 21, 1997 now U.S. Pat. No. 5,908,350, which is a continuation-in-part of U.S. provisional application No. 60/018,980 filed on Jun. 4, 1996. The disclosures of the two above-identified applications are hereby expressly incorporated herein by reference.

BACKGROUND OF THE INVENTION

1. Field of the Invention

This invention relates generally to cleaning devices for cleaning vinyl, acrylic and similar surfaces. The cleaning devices are especially well suited for cleaning vinyl or acrylic swimming pools, hot tubs or spas.

2. Description of the Related Art

Swimming pools or spas are sometimes formed of vinyl or vinyl type materials, or acrylic or acrylic type materials, such as fiberglass or gel-coat. In general, swimming pool that have walls formed of non-rigid materials are referred to as vinyl pools; in contrast to concrete, gunite, plaster, etc. Algae stains, metal stains, and calcium scale often build up on the walls of swimming pools. Often at the "water line" particularly difficult stains often form. Some stains may be removed with a brush or rag, but persistent stains are more difficult to remove. Unlike concrete swimming pools, vinyl pools can not be easily drained and "acid washed" because the vinyl walls will lose their shape.

Accordingly, there is a long-felt need in the art for a cleaning device for cleaning vinyl and acrylic type surfaces, and especially as applied to swimming pools and spas.

SUMMARY

Accordingly, one object of the present invention is to overcome the difficulties of the prior art.

The present invention is directed to a cleaning composition for cleaning concrete pools and other concrete devices. The composition includes an aggregate which is an abrasive that does the cleaning, and a binder that holds the aggregate together to be used in the cleaning process. The present invention achieves a balance between the performance of the aggregate and the binder in that the aggregate and the binder substantially uniformly wear down in balance with each other so as to efficiently use the majority or preferably substantially all of each layer of aggregate before the binder releases it, and a new layer is presented.

Accordingly, in one aspect of the invention the cleaning device comprises a handle; and a cleaning composite formed on the handle including (i) a polymer having an elongation at break of about 500% or greater, and (ii) at least one type of aggregate.

Other objects, advantages and features of the invention will become apparent to those of ordinary skill in the art upon reading the detailed description below.

BRIEF DESCRIPTION OF THE DRAWINGS

FIG. 4 is a side view of a second embodiment of the mold.

FIG. 5 is a cross-sectional view of the mold of FIG. 3.

DETAILED DESCRIPTION

Figure 1:
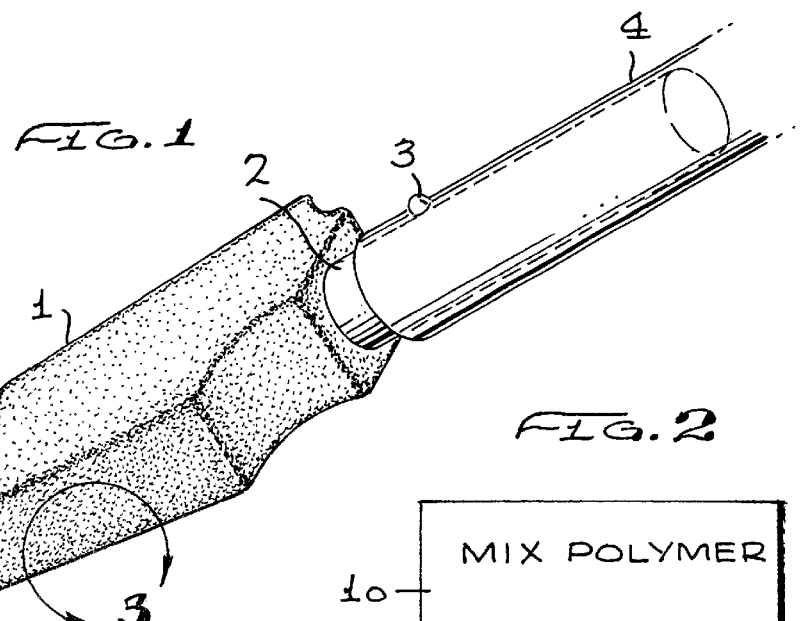
FIG. 1 is a perspective view of the cleaning tool of the invention.

A cleaning tool of the present invention is illustrated in FIG. 1. It includes a cleaning portion 1 and a handle 2 extending therefrom. Handle 2 is preferably provided with a snap clip 3 for engagement in a conventional manner with a swimming pool accessory extension pole 4. Of course, any type of shape or handle may be used in lieu of the above.

The cleaning tool is especially useful in removing surface blemishes from vinyl pools and acrylic hot tubs or spas. Such surface blemishes include algae stains, calcium deposits, and "water line" stains, swimfin stains, etc. on the pool or spa walls and floor. However, it should be appreciated that the present invention is well suited for cleaning other types of articles, such as, bathroom tubs, sinks and other vinyl-type or acrylic-type items including figerglass boats, RVs, acrylic aquariums, the removal of graffiti, etc. It should also be noted that the device disclosed in parent application Ser. No. 08/861,403 is also especially useful in removing graffiti from cement, fences, etc.

The cleaning composition is formed of at least one aggregate used as the cleaning or abrasive element of the device and a selected polymer, described more fully below, which tool posts or encases the aggregate.

The selected polymer may be The Smooth On PMC-121/30 product, which is manufactured by the Smooth-On Company in Gillette, N.J. It has the following properties. A viscosity of 1,800 cps, a specific gravity of 1.04 g/cm$^3$, a specific volume of 27.7 cubic inches per pound, an elongation at break of greater than 1000%, Ultimate tensile strength of 400 PSI, a shore A hardness of 30, a compression set of 26.9%, a 100% modulus of 54 PSI, and a tear strength of 82 PLI. However, other polymers may be used in accordance with the guidelines provided below.

The materials selected for use in the present invention work in combination such that the binder which holds the aggregate material wears at substantially the same rate as the aggregate. Thus, as the aggregate wears down and loses its cleaning ability, the binder also wears down until the spent aggregate and binder fall off the device. As a result, a new layer of aggregate and binder are exposed to, provide a new cleaning surface. It was found that for vinyl-type material and acrylic-type material silica sand no. 90 provide unexpectedly good cleaning ability, while not scratching the surface of the product being cleaned. However, it is to be understood that other types of aggregate or sand size may be used.

According to one aspect of the invention, the cleaning device comprises a composition of matter including the following elements in percentages by volume: 40% of a polymer having a 30 shore A hardness and an elongation at break of about 500% or greater, such as PMC 121/30 marketed by Smooth-On Corporation of Gillette, N.J., 5% MEK (methyl ethyl ketone), 55% silica sand no. 90.

Figure 2:
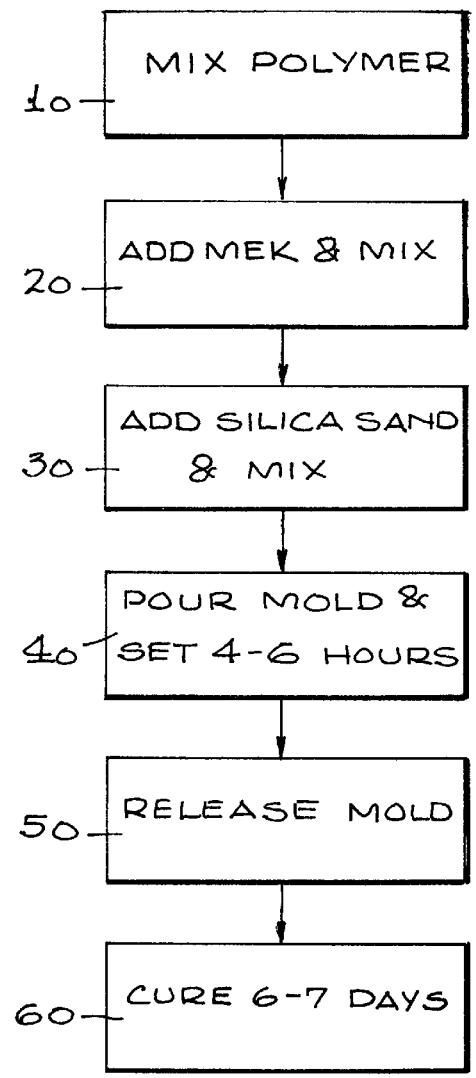
FIG. 2 is a flow chart of the method of making the cleaning tool of the invention.

FIG. 2 illustrates a method of making the cleaning tool of the invention. As Smooth-On PMC 121 is a two-part polymer, there is a part A and a part B which must be mixed together to form the product. Typically this is done in a pail with plastic spatula. In step 10, part A and part B are mixed at a 1:1 ratio for approximately 1 minute to constitute 40% of the entire volume to be made. Next, in step 20, MEK is added to the mix to constitute 5% of the volume of material to be made and the mix is continued to be mixed for another minute to two minutes. In step 30, 55% sand no. 90 is added and the mixture is again mixed for a minute or two minutes. In step 40 the mixture is poured into a mold and allowed to set for 4–6 hours at room temperature. The mold is then released (step 50) and the product allowed to cure for an additional six or seven days (step 60).

Alternatively, the mold may be preheated, e.g. to about 110° F. This reduces the molding time from 4 hours to about 1.5 hours.

Figure 3:
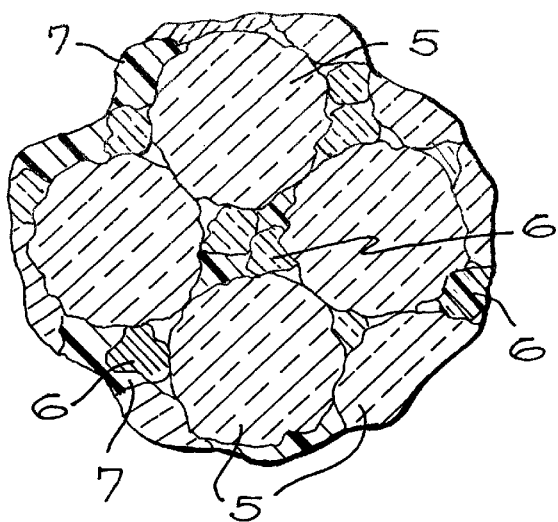
FIG. 3 is an exploded view of a mold for making the cleaning tool of the invention.

FIG. 3 illustrates a mold 70 for use with the invention. As shown, the mold 70 has two parts 72 and 74 which join together when the composition is poured. Each part 72 and 74 have cut-outs 76 formed therein to form the shape of the molded tool. The top of each part of the mold 70 also has a semi-circle 80a or 80b formed therein such that when parts 72 and 74 are joined together semi-circles 80a and 80b form a full circle 82. The mixture is then poured through the circle 82 and handle 2 is then inserted through the circle 82 into the mold. The mold is released by separating the two parts 72 and 74 of the mold 70.

If preheating of the mold is desired, electric heating elements (not shown) may be placed in contact with mold 70, which is preferably made from aluminum. Preheating as described above may also be used in the molding process described in parent application Ser. No., 08/861,403.

FIG. 4 shows an alternate embodiment of the mold 70' in which multiple molds are stacked upon each other.

Having thereby described certain embodiments of the invention, it will be apparent to those skilled in the art that many modifications may be made within the scope of the invention. Therefore, the scope of the invention is only limited by the appended claims.

For example, in certain embodiments of the invention, titanium dioxide may be added to the mix in a small amount to suitably color the final product.

What is claimed is:

1. A cleaning device for vinyl-type or acrylic-type swimming pools and spas, comprising:

a handle; and a cleaning composite formed on the handle including (i) a polymer having an elongation at break of about 500% or greater, (ii) at least one type of aggregate.

2. The claimed device of claim 1, wherein said polymer is Smooth-On PMC 121/30.

3. The claimed device of claim 1, wherein the at least one type of aggregate is silica sand no. 90.

4. A cleaning composition comprising:

at least one type of aggregate which is friable;

a binder for binding the at least one type of aggregate together;

wherein upon the cleaning composition being scrubbed against a vinyl or acrylic-type item, the at least one type of aggregate and the binder all wear at substantially the same rate.

5. The cleaning composition of claim 4, wherein the at least one type of aggregate is silica sand no. 90.

6. The cleaning composition of claim 4, wherein the binder is a polymer having an elongation to break of at least 1000%, and shore A hardness of 30.

7. The cleaning composition of claim 4, further comprising a polymer thinner.

8. The cleaning composition of claim 7, wherein the polymer thinner is methyl ethyl ketone.

9. A cleaning composition consisting essentially of:

about 40% by volume of a polymer having an elongation to break of about 500 or greater %, and a shore A hardness of 30;

about 5% by volume of a polymer thinner;

about 55% by volume of an aggregate.

10. The cleaning composition of claim 9, wherein the aggregate is silica sand.

11. The cleaning composition of claim 9, wherein the polymer thinner is methyl ethyl ketone.

12. The cleaning composition of claim 9, wherein the polymer is Smooth-On PMC-121/30.

\* \* \* \* \*